United States Patent [19]

Habermann et al.

[11] 4,128,795
[45] Dec. 5, 1978

[54] DEVICE FOR DAMPING THE CRITICAL FREQUENCIES OF A ROTOR SUSPENDED BY A RADIAL ELECTROMAGNETIC BEARING

[75] Inventors: Helmut Habermann; Maurice Brunet; Pierre Joly, all of Vernon, France

[73] Assignee: Societe Europeene de Propulsion, Puteaux, France

[21] Appl. No.: 751,968

[22] Filed: Dec. 17, 1976

[30] Foreign Application Priority Data

Dec. 24, 1975 [FR] France ............................... 75 39760

[51] Int. Cl.² ............................................... G05B 5/01
[52] U.S. Cl. ...................................... 318/618; 318/616; 318/605; 318/637; 318/661; 318/621; 318/622
[58] Field of Search ............... 318/605, 637, 661, 615, 318/621, 616, 617, 618, 632, 622; 310/308; 308/10

[56] References Cited

U.S. PATENT DOCUMENTS

| 3,428,791 | 2/1969 | Chandos | 318/561 X |
| 3,460,013 | 8/1969 | Gaylor | 318/615 X |
| 3,808,486 | 4/1974 | Cuda et al. | 318/620 |
| 3,988,658 | 10/1976 | Meinke et al. | 318/647 |

Primary Examiner—Robert K. Schaefer
Assistant Examiner—Eugene S. Indyk
Attorney, Agent, or Firm—Lewis H. Eslinger

[57] ABSTRACT

A device is disclosed for damping the critical frequencies of a rotor suspended by a radial electromagnetic bearing which has means associated therewith for detecting the radial position of the rotor, comprising a servo-circuit for connection between the detecting means and windings of the electromagnetic bearing and including a circuit for controlling the current supply to the windings in response to signals from the detecting means to keep the rotor in a predetermined radial position. The servo-circuit is provided with means for the selective amplification of the phase advance gain of said circuit in a frequency equal to the speed of rotation of the rotor for damping said critical frequencies.

6 Claims, 6 Drawing Figures

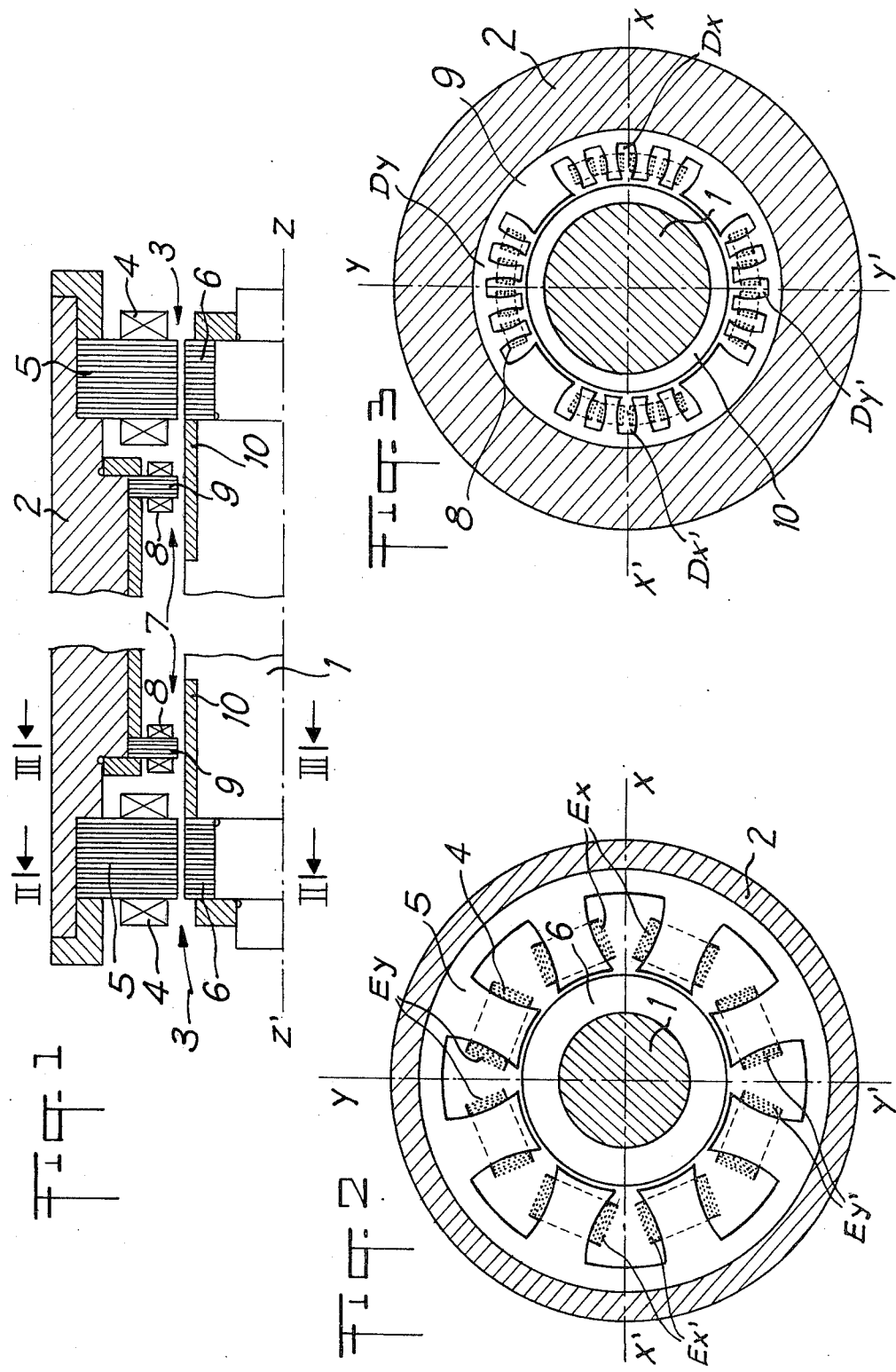

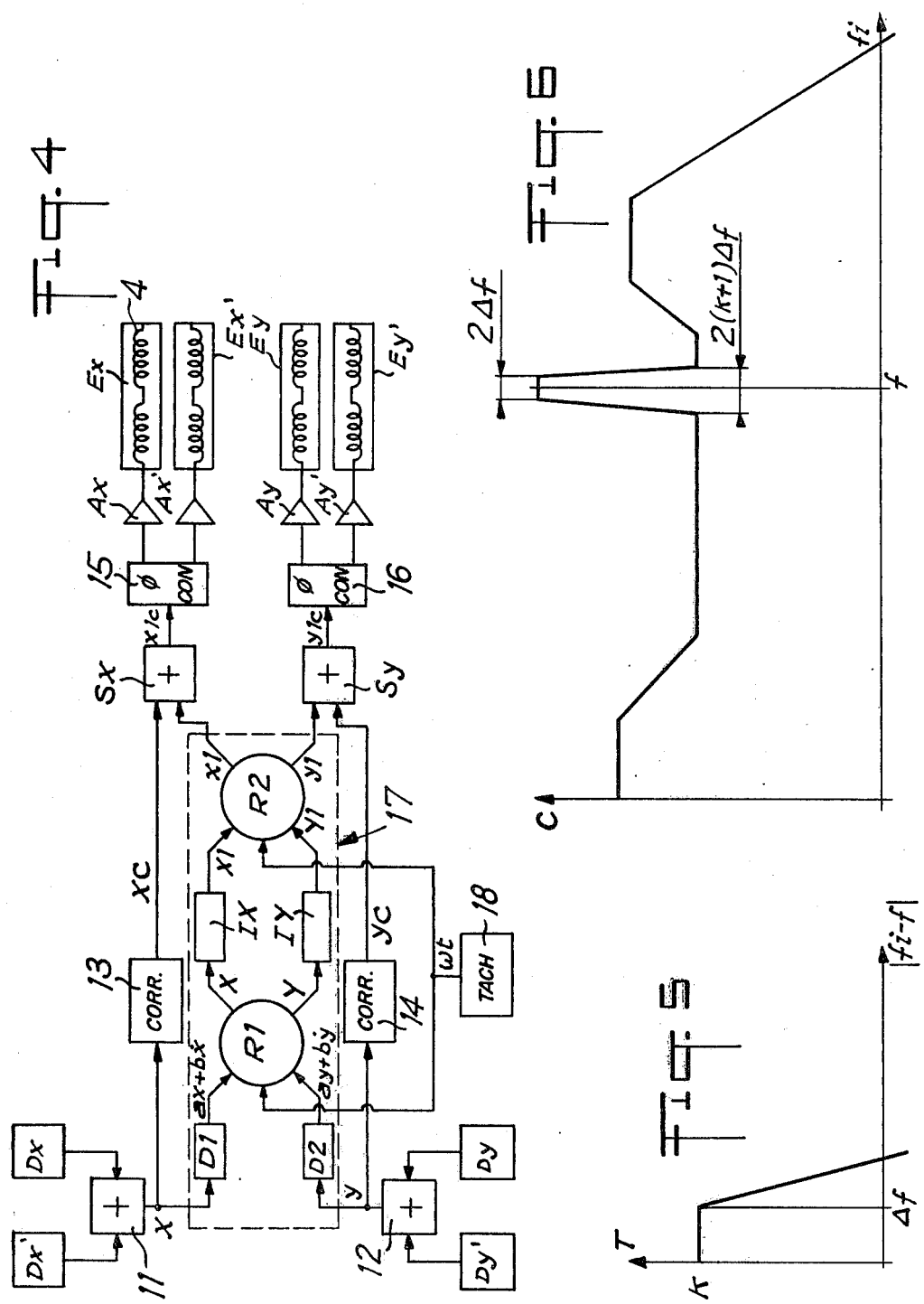

DEVICE FOR DAMPING THE CRITICAL FREQUENCIES OF A ROTOR SUSPENDED BY A RADIAL ELECTROMAGNETIC BEARING

The present invention relates to a device for damping the critical frequencies of a rotor suspended by a radial electromagnetic bearing which has means associated therewith for detecting the radial position of the rotor, comprising a servo-circuit for connection between the detecting means and windings of the electromagnetic bearing and including a circuit for controlling the current supply to the windings in response to signals from the detecting means to keep the rotor in a predetermined radial position.

In such a suspension system any disturbance resulting in a modification of the radial position of the rotor gives rise to a reaction at each radial bearing of the rotor. The rigidity of each bearing is dependent upon the frequency of the disturbances detected as well as on their amplitude and is characterised in the gain of the servo-circuit connecting the detecting means to the windings of the electro-magnetic bearing.

It has been observed that this gain may prove to be inadequate to hold the rotor efficiently in the case of certain disturbances. The same applies to the disturbances, known as synchronous disturbances, of a frequency equal to the speed of rotation of the rotor, particularly when this speed reaches a critical value. Indeed for any rotating part there are critical speeds for which the part becomes deformed in bending, with the presence of nodes and bulges. These critical speeds are generally high. But with a rotor suspended by means of magnetic bearings, very high speeds of rotation may be reached and the problem is then how to attain such speeds beyond the critical speeds.

To permit this going over the limit with good damping of the disturbances, one solution could be a general increase of the phase advance of the servo-circuit. However, such an increase of the phase advance, and therefore of the gain, would apply for all disturbances and would result in an unjustified increase for disturbances other than those which occur when the critical speeds are exceeded. This increase of gain would then result in a net increase in the power consumption of the bearings.

One object of the present invention is to provide a device for the magnetic suspension of a rotor which permits an efficient reaction of the, or each, bearing to synchronous disturbances. In particular it should make it easy to exceed the critical speeds of the rotor while avoiding the drawbacks mentioned above.

According to the present invention there is provided a device for damping the critical frequencies of a rotor suspended by a radial electromagnetic bearing which device has means associated therewith for detecting the radial position of the rotor, and comprising a servo-circuit for connection between the detecting means and windings of the electromagnetic bearing and including a circuit for controlling the current supply to the windings in response to signals from the detecting means to keep the rotor in a predetermined radial position, the servo-circuit having means for the selective amplification of the phase or phase advance gain of said circuit in a frequency band centered on a frequency equal to the speed of rotation of the rotor.

This enables an increase of the phase or phase advance gain of the servo-circuit to be obtained in a frequency band centered around the frequency equal to the speed of rotation of the rotor, and therefore an increase of the rigidity or of the damping of the bearing for synchronous disturbances.

In a preferred form, the device includes first and second means for connection to the detecting means and adapted to supply respectively first and second input signals representing the radial position of the rotor respectively according to first and second axes of reference, these axes being fixed and perpendicular to each other and to a predetermined axis of rotation of the rotor, and the control circuit having first and second inputs connected respectively to said first and second input signal supply means and amplifying circuits connected to said windings. In this case, said means of selective amplification will advantageously comprise first and second two-input adders having their first inputs connected respectively to said first and second input signal supply means and their outputs to said amplifying means, and a derivation circuit connected between said first and second input signal supply means and the second inputs of the said adders; this derivation circuit comprising a first conversion circuit of the type able to perform a conversion of coordinates of the fixed reference system provided by said fixed axes into a rotating reference system constituted by two axes perpendicular to each other and to the axis of rotation of the rotor and rotating therewith, this first conversion circuit having two inputs connected to said first and second input signal supply means respectively and providing third and fourth signals at first and second outputs, a first integrator connected with the first output of the conversion circuit to receive said third signal and integrate it, a second integrator connected with the second output of the first conversion circuit to receive said fourth signal and integrate it, a second conversion circuit of the type able to perform a conversion of coordinates of said rotating reference system into said fixed reference system, said second conversion circuit having two inputs connected respectively to the first and second integrators to convert the signals supplied by said integrators into fifth and sixth signals, and the second inputs of the first and second adders being connected to said second conversion circuit to receive respectively said fifth and sixth signals.

This derivation circuit makes it possible to perform a selective amplification of the gain of the servo-circuit in a frequency band centered on a frequency constantly and automatically slaved to the speed of rotation of the rotor.

Preferably, the derivation circuit comprises first and second derivation circuits disposed repectively upstream of the first and of the second inputs of the first conversion circuit.

By introducing into the derivation circuit, not the signals representative of the deviation of the radial position of the axis of the shaft in relation to its predetermined position, but the derivatives of said signals, there is obtained a selective increase of the gain in phase advance and therefore a damping of the synchronous disturbances of said frequency band. This enables the rotor to exceed the critical speeds with a reduced eccentricity.

For a better understanding of the present invention one embodiment will now be described, by way of example, with reference to the accompanying drawings, in which:

FIG. 1 is a half axial section of a rotor mounted in radial magnetic bearings;

FIG. 2 is a full radial section on the line II—II of FIG. 1;

FIG. 3 is a full radial section on the line III—III of FIG. 1;

FIG. 4 is a diagram of a servo-circuit incorporating a device in accordance with the invention;

FIG. 5 is a graph associated with a derivation circuit of the servo-circuit shown in FIG. 4, the graph showing the gain of the derivation circuit as a function of the frequency of disturbances, and FIG. 6 is a graph showing the rigidity of a bearing, slaved in accordance with the invention, as a function of the frequency of disturbances.

FIGS. 1 to 3 show a rotor 1 supported in a stator 2 by means of two radial magnetic bearings 3. Each bearing is an electro-magnet with eight windings 4 mounted on poles of a fixed armature 5. These cooperate with a ring armature 6 fixed to and co-axial with the rotor 1.

The windings are arranged as two sets of opposed pairs pairwise Ex, Ex', and Ey, Ey' associated with two fixed orthogonal diametral axes X'X and Y'Y respectively. These reference axes are perpendicular to the predetermined rotational axis Z'Z defined by the bearing. The pairs of a set, for example Ex and Ex' are diametrically opposed and each exerts an attraction on the rotor when their windings are energised. In the example illustrated, each pair of windings 4 is connected in series.

Each bearing has associated with it a radial detection device 7 with two pairs of detectors Dx, Dx' and Dy, Dy' disposed on two fixed axes respectively parallel to X'X and Y'Y. The two detectors of one and the same pair are diametrically opposed. In the example illustrated each detector is constituted by several windings 8 mounted on a fixed armature 9 cooperating with a ring armature 10 fixed to and coaxial with the rotor 1. Other types of detector may be used, in particular detectors of the capacitive or optical type.

The rotor 1 may be driven by means of an electric motor (not shown) having its stator fixed with respect to the stator 2 and its rotor fixed with respect to the rotor 1.

It is known to slave each bearing from the signals of the detectors by means of a circuit comprising adders such as 11 and 12 (FIG. 4) which summate the signals of each pair of detectors and deliver at their respective outputs signals x and y representative of the gap between the actual and predetermined radial positions of the axis of rotation of the rotor, respectively along axes X'X and Y'Y.

In a known servo-circuit, the signals $x$ and $y$ are applied to the inputs of respective corrector circuits 13, 14, which for example may be phase advance networks. These deliver at their outputs control signals $x_c$ and $y_c$ which govern the excitation of the associated windings Ex, Ex', Ey and Ey'. These control signals are, for example, applied to phase converters 15, 16 which produce signals $x'_c$, $x''_c$ and $y'_c$, $y''_c$. These are amplified by means of amplifiers Ax, Ax', Ay and Ay' and then applied to the windings with the suitable polarity. Several such servo-circuits are known; see for example French Pat. No. 2,149,644.

In this damping system shown in FIG. 4, a derivation circuit 17 is connected between the detectors and the amplifiers supplying the bearing windings. Its function is to perform a selective amplification of the gain of the servo-circuit in a frequency band centered on a frequency equal to the speed of rotation of the rotor.

The derivation circuit 17 comprises a first conversion circuit or resolver R1 with a first input connected to the output of the adder 11 through a circuit D1 and a second input connected to the output of the adder 12 through a circuit D2. The circuits D1 and D2 are circuits of the deriver or differentiating type producing output signals respectively of the form $ax + b\dot{x}$ and $ay + b\dot{y}$, $\dot{x}$ and $\dot{y}$ being the derivatives of the signals $x$ and $y$ and $a$ and $b$ being constants. The resolver R1 supplies at its two outputs signals X and Y such that:

$$\begin{cases} X = (ax + b\dot{x})\cos\omega t + (ay + b\dot{y})\sin\omega t \\ Y = -(ax + b\dot{x})\sin\omega t + (ay + b\dot{y})\cos\omega t \end{cases}$$

$\omega$ being equal to the angular velocity of the rotor and $t$ representing time.

The resolver R1 therefore converts coordinates in the fixed reference system with the axes X'X and Y'Y into a moving reference system rotating with the rotor and relative to the fixed reference system at an angular velocity $\omega$.

The signals X and Y are integrated by two integrators IX and IY which supply output signals $X_1$, $Y_1$ respectively. These signals $X_1$ and $Y_1$ are applied respectively to first and second inputs of a second conversion circuit or resolver R2 which performs a reverse conversion to that performed by the resolver R1. It therefore supplies respective output signals $x_1$ and $y_1$ such that:

$$\begin{cases} x_1 = X_1 \cos\omega t - Y_1 \sin\omega t \\ y_1 = X_1 \sin\omega t + Y_1 \cos\omega t \end{cases}$$

An adder Sx receives at its two inputs the signal $x_1$ and the signal $x_c$ from the corrector circuit 13 to which the signal x is applied. An adder Sy receives at its two inputs the signal $y_1$ and the signal $y_c$ from the corrector circuit 14 to which the signal y is applied. The adders Sx and Sy transmit signals $x_{1c}$ and $y_{1c}$ respectively to the phase-converters 15 and 16 which produce the signals $x'_c$, $x''_c$ and $y'_c$, $y''_c$.

The resolvers R1 and R2 each receive at third inputs a signal $\omega t$, supplied by a tachometric converter circuit 18, of a magnitude proportional to the actual speed of rotation of the rotor. These resolver circuits, or generator, R1 and R2 convert coordinates between a fixed reference system and a rotating reference system and may be of known construction. In particular, the circuit 17 may be a numerical circuit, the signals x and y being converted into numerical form before being applied to the circuit 17 and signals $x_1$ and $y_1$ being converted into analogue form at the output of circuit 17.

Assuming that fi denotes the frequency of the signals from the detectors and f the speed of the rotor in revolutions per second, the transfer function T of the circuit comprising the resolver R1, the integrators IX and IY and the resolver R2 varies as illustrated by the asymptotic representation of FIG. 5. $\Delta f$ represents the pass band of the integrators and K their gain. We have:

$$T = \frac{K}{1 + \frac{P}{\Delta \omega}}$$

with $P = j|\omega_i - \omega| = 2\pi j |f_i - f|$ and $\Delta\omega = 2\pi\Delta f.$ This results for the rigidity C of the bearing, as for the overall transfer function of the servo-circuit, in an increase of the gain in a frequency band centered on a constant frequency equal to f. Therefore selective amplification of the gain is achieved for a frequency constantly slaved to the speed of rotation of the rotor.

As the objective is to modify this transfer function for synchronous disturbances, it will be possible to restrict the width of this frequency band to a low value, for example of the order of 1 Hz, and thus to limit the pass band Δ f of the integrators IX and IY to the very low frequencies, for example to the frequencies of the order of 1 Hz. It will also be possible to have integrators IX and IY with regulable gain K in order to be able to regulate the local increase of the gain of the overall transfer function.

The use as input signals of the derivation circuit 17 of signals of the form $ax + b\dot{x}$ and $ay + b\dot{y}$ results, for the overall transfer function, in an increase of the phase advance gain. This is equivalent to introducing substantial damping forces for small deviations of the radial position of the shaft of the rotor and for synchronous disturbances. Critical speeds can then easily be exceeded with limited eccentricity, and therefore little bending.

Various modifications or additions to the system are envisaged. In particular, although described in terms of a single radial bearing associated with a single radial detection device, it will be understood that the device described can apply to every radial bearing-detector assembly in the rotor suspension system.

We claim:

1. A magnetic suspension system for suspending a rotor and comprising at least one electromagnetic radial bearing from which said rotor is suspended, said bearing including electromagnetic windings; detecting means for detecting the radial position of the rotor and for producing a position signal representative of said radial position of the rotor; energizing means for supplying a current to said windings; and a servo-circuit coupled between said detecting means and said energizing means for controlling the current supplied to said windings in response to said position signal so as to keep said rotor in a predetermined radial position, wherein said servo-circuit comprises:
   selective amplification means for selectively amplifying said position signal in a frequency band centered on a controllable central frequency; and
   means for supplying to said selective amplification means a signal representative of the speed of rotation of the rotor for continuously slaving said central frequency of the frequency band in which said position signal is amplified to the rotational speed of the rotor, whereby critical frequencies of the rotor are damped by selective increase of the stiffness of the bearing.

2. A magnetic suspension system for suspending a rotor and comprising at least one electromagnetic radial bearing from which said rotor is suspended, said bearing including electromagnetic windings; first and second detecting means for detecting the radial position of the rotor and for producing first and second position signals representative of said radial position of the rotor with respect to first and second reference axes, respectively, which are perpendicular to each other and to a predetermined axis of rotation of said rotor in a fixed reference system; energizing means for supplying a current to said windings; and a servo-circuit coupled between said first and second detecting means and said energizing means for controlling the current supplied to said windings in response to said first and second position signals so as to keep said rotor in a predetermined radial position, wherein said servo-circuit comprises:
   selective amplification means receiving said first and second position signals to selectively amplify said position signals in a frequency band centered on a central frequency; and
   means for supplying to said selective amplification means a signal representative of the speed of rotation of the rotor for continuously slaving said central frequency of the frequency band in which said position signals are amplified to the rotational speed of the rotor, whereby critical frequencies of the rotor are damped by selective increase of the stiffness of the bearing.

3. A magnetic suspension system as claimed in claim 2, wherein said selective amplification means comprises:
   a first conversion circuit receiving said first and second position signals and providing third and fourth signals, said first conversion circuit performing a conversion of coordinates from said fixed reference system to a rotating reference system constituted by two axes perpendicular to each other and to the axis of rotation of the rotor and rotating with an angular velocity related to the rotation of said rotor;
   a first integrator connected to said first conversion circuit for receiving and integrating said third signal;
   a second integrator connected to said first conversion circuit for receiving and integrating said fourth signal;
   a second conversion circuit receiving the integrated signals from said first and second integrators and providing fifth and sixth signals, said second conversion circuit performing a conversion of coordinates from said rotating reference system to said fixed reference system;
   a first adding circuit having a first input terminal coupled to said first detecting circuit, a second input terminal coupled to said second conversion circuit for receiving said fifth signal and an output terminal coupled to said energizing means; and
   a second adding circuit having a first input terminal coupled to said second detecting circuit, a second input terminal coupled to said second conversion circuit for receiving said sixth signal, and an output terminal coupled to said energizing means.

4. A magnetic suspension system as claimed in claim 3, wherein said first and second conversion circuits are resolver-circuits connected to a tachometric generator, the latter supplying a signal representative of the rotational speed of the rotor.

5. A magnetic suspension system as claimed in claim 3, wherein said selective amplification means includes first and second differentiating circuits connected between said first and second means, respectively, and said first conversion circuit.

6. A magnetic suspension system as claimed in claim 3, wherein each of said first and second integrators has a pass band limited to relatively low frequencies on the order of 1 Hz.

* * * * *